United States Patent Office 3,223,656
Patented Dec. 14, 1965

3,223,656
UREA-FORMALDEHYDE MOLDING COMPOSITIONS CONTAINING CYANURIC ACID AS LATENT CURING CATALYST AND METHOD
Thomas C. Frazier, Hopewell, Va., assignor to Allied Chemical Corporation, New York, N.Y., a corporation of New York
No Drawing. Filed Mar. 28, 1961, Ser. No. 98,736
6 Claims. (Cl. 260—17.3)

This invention relates to thermosetting molding compositions comprising a urea-formaldehyde reaction product and a latent catalyst therefor, and to a process for making the same.

Urea-formaldehyde compositions that may or may not include fillers of various kinds (e.g., paper pulp, sawdust, alpha-cellulose, carboxymethyl cellulose, litharge, asbestos, sub-divided resins, whiting, lamp black, etc.) have had wide-spead commercial acceptance for many field applications for quite some time. An important group of these compositions are urea-formaldehyde molding compounds, and particularly those that contain a cellulosic material, particularly alpha-cellulose, as filler, and are prepared in the form of granular solids or powders. The nature and form of these molding compounds permit facile handling by the molder, ready introduction into molds of various configurations, and the allowance of the application of heat and pressure during the molding operation without danger of the molding compound being squirted or squeezed from the mold. These molding powders have other excellent molding characteristics, including minimum damage to expensive molds and, when cured, result in articles that have desirable impact and other physical characteristics including appearance and feel. Furthermore, the hard, smooth surfaces of articles molded from these urea-formaldehyde molding compounds are easy to clean and are resistant to household chemicals, scratching, chipping and cracking. The cured articles, in addition, have good electrical properties and are odorless and tasteless. Hence, urea-formaldehyde molding compositions of this type have continuously been used successfully to produce numerous articles, as for example, switch plates, radio and television cabinets, clock casings, scale housings, buttons, cosmetic and jewelry containers, cigarette holders, pipe stems, beads, and the like.

Despite the very desirable advantages inherent in the use of commercially-obtainable urea-formaldehyde molding powders, there is still something to be desired with respect to simplification of the presently-conventional methods for the preparation of the finished molding powders, the storage stability of the finished compounds, the curing speed thereof, and also the tensile strength and resistance to water-absorption of the finished products obtained when the compounds are ultimately cured under molding conditions of heat and pressure.

For the purpose of diminishing or obviating the deficiencies of urea-formaldehyde molding compounds in the foregoing and other categories, various curing catalysts or hardening agents, as they are sometimes known in the art, have been suggested and used. These catalysts are usually of an acid nature or are compounds that transform by breaking up or undergoing molecular rearrangement to form an acid only after the molding temperature is reached. Unfortunately, the inclusion of acid substances in urea-formaldehyde molding compounds has posed its own problems since, in spite of the necessity for the existence of acid conditions during the molding of such compounds, the latter cannot be supplied in an acid condition by the manufacturer because in such form the urea-formaldehyde molding compounds are unstable upon storage and gradually become infusible at ordinary temperatures and, hence, worthless to the molder. Even slight acidity that causes the molding compounds to become infusible very gradually, also renders such compounds unacceptable commercially since the plasticity and other molding properties of the composition are in such case quite variable, being wholly dependent upon the prevailing ambient temperature and the time elapsing between production of the compounds and the ultimate molding thereof by the user. As a result, even if the unstable compounds are still usable in the sense that they still have retained some plasticity, it is impossible for the molder to mold the compounds into successive articles that have satisfactorily uniform properties.

Typical of the compounds now in use which function as latent acid catalysts that hasten cure during molding under heat and pressure are cinnamic acid and ethylene bisbenzene sulfonate, that are normally solid materials which melt under said molding conditions. Other materials that are usable for the same purpose include oxalic acid, benzoic acid, phthalic acid, etc.

Urea-formaldehyde molding compounds of the prior art now in use that comprise a latent acid catalyst of the type referred to above, are commonly made by processes which may include the two general steps given below:

In the first step, aqueous formaldehyde, urea and preferably a small amount of ammonia to bring the reacting mass to the desired pH range of from 6–10 are admixed and reacted at relatively low temperatures, e.g., 20° to 40° C., for several hours to produce a resinous syrup. Preferably, to provide optimum molding characteristics in the final product, from 1.5 to 1.6 mols of formaldehyde per mol of urea are used, although other ratios are, of course, possible. The condensation is preferably brought about in aqueous solution for from 0.5 to 2 hours at about room temperature. The transparent condensate solution obtained is then preferably combined with about one-third of its weight of cellulose. Alpha-cellulose is preferred although other or a combination of other cellulosic-type fillers such as wood flour, wood pulp, newsprint, printed newspaper, sawdust, shavings, walnut shell flour, or ground corn cobs may also be used. In the second step, the resulting damp mass is dried, preferably at a temperature of about 90°–100° C. and, in the resulting dried product, there are then dispersed minor ingredients, including plasticizers, stabilizers, pigments and lubricants of conventional types well known in this art and referred to hereinafter. It is preferred, however, to include at least a small amount of a compound that functions as mold lubricant, e.g., zinc stearate, and about 1% of the particular latent hardening catalyst chosen. Then the mixture is conventionally ground in a ball-mill to result in the final powdered product. Coloring material may optionally be added to the condensate syrup or to the dried product before ball-milling. However, since the usual latent acid-hardening catalyst would prematurely cure the composition if added to the condensate prior to drying, it is presently most often introduced into the dried product and admixed by the ball-milling operation.

With the foregoing in view, it is a primary object of the present invention to provide a novel latent hardening catalyst for urea-formaldehyde molding compounds.

Another object of the invention is to provide a method for preparing urea-formaldehyde molding compounds that contain said latent hardening catalyst.

It is another object of the invention to provide such catalysts that may be incorporated into the condensate syrup rather than into the dried mass which must ordinarily then be ball-milled to an appreciable extent for proper dissemination of the catalyst throughout the molding powder.

Another object is to provide a catalyst which does not harden the condensate at normal drying temperatures during the processing into the particulate molding compound but does serve as an effective hardening catalyst for the finished product at molding temperatures.

It is another object of the invention to provide urea-formaldehyde molding compounds that contain a latent catalyst and are desirably stable at the temperatures encountered during normal storage.

It is another object to provide such compounds that thermoset to form high quality moldings.

Further objects and advantages of the invention will be apparent from the following detailed description.

In its broadest aspect, the invention resides in my discovery that cyanuric acid functions as an admirable latent catalyst for urea-formaldehyde condensate.

The final molding compounds of my invention comprise a solid, particulate mixture of (1) urea-formaldehyde condensate, (2) a cellulosic filler, and (3) a small amount of cyanuric acid as latent catalyst. Preferably, the solid particulate mixtures are in granular or powder form, are slightly acidic and contain one or more of the additives conventionally included in urea-formaldehyde molding compositions of the prior art, as already referred to hereinbefore and discussed below. The cyanuric acid may comprise from 1% to 7% by weight of the urea-formaldehyde content of the condensate syrup utilized in preparing the compounds or, stated otherwise, from 0.5% to 5% by weight of the final compounds.

As stated previously, commercial urea-formaldehyde molding compounds conventionally contain dispersed therein such minor ingredients (in addition to latent catalyst) that function as stabilizers, plasticizers, pigments, and lubricants. Of the typical stabilizers now in use, that function to retard premature curing under storage conditions, there may be mentioned as examples, hexamethylenetetramine and ammonium carbonate. Typical plasticizers in use, that provide plasticization of the compositions during the molding operation, include glycerine, monoethers of glycerine, butylurea and toluene sulfonamide. Typical lubricants, that function as mold release agents for the cured articles, are the long-chain aliphatic acids, such as stearic acid and oleic acid, as well as their metal salts, such as zinc stearate and zinc oleate.

Conventional pigments, e.g., titanium dioxide, Hansa yellow, etc., may be omitted or included as desired, depending upon the transparency, translucency and color of the product that the molder is interested in.

While a typical condensate-filler ratio has been referred to hereinbefore; as is well-known in the art, the filler limits may vary considerably as from 25% to 60% by weight of the urea-formaldehyde content of the condensate syrup, for example, and may comprise a minor amount, say from 20% to 35% by weight of the final molding compound.

Alternative to the use, in the preparation of catalyzed urea-formaldehyde molding powders in accordance with the present invention, of urea-formaldehyde resins, such as those prepared by conventional procedures, including that referred to generally hereinbefore in the discussion of the prior art, non-resinous mixtures of urea-formaldehyde condensates and urea may be employed effectively. The condensates per se may be prepared in accordance with U.S. Patent No. 2,652,377, admixed with additional urea to obtain the desired formaldehyde to urea molar proportions as referred to in said patent, and the molding powders of the present invention catalyzed with cyanuric acid, then prepared generally as when the resinous materials are employed. The urea-formaldehyde condensate per se may be obtained commercially as U.F. Concentrate-85 that is manufactured and sold by Allied Chemical Corporation.

In addition to my discovery that cyanuric acid surprisingly has the advantages of known latent hardening catalysts and furthermore results in high-quality moldings, I have discovered that cyanuric acid need not be added to the dried material in the second step of the general process conventional for preparing urea-formaldehyde molding compounds. Instead, it may be dissolved in the condensate syrup that is prepared in the first step. This permits excellent dissemination of the catalyst throughout the finished molding product, even if the material is not ball-milled or is only lightly ground.

I have further discovered that the best measure for control of the amount of cyanuric acid to be introduced into the alkaline urea-formaldehyde condensate syrups is not the pH of the latter. Control by reference to pH is adequate only to the point where the condensate syrup is essentially neutral, after which the pH changes but little, while (preferably 1%–3% by weight of the total urea-formaldehyde content) additional cyanuric acid is added. Alternatively, the syrup may be neutralized with a substance other than the cyanuric acid in accordance with known procedures and thereafter the latter substance is added for its function as latent catalyst.

In the addition of the cyanuric acid to the condensate syrups, only a few minutes are required for said acid to dissolve in the syrup. While I do not wish to be bound by this theory, it is my belief that in the process in accordance with the present invention, when the cyanuric acid is dissolved in the syrup; the acid reacts with the formaldehyde to form a soluble compound which is stable at low temperatures. Surprisingly, this acid catalyst does not harden the resin at normal drying temperatures, but does serve as an active hardening catalyst at molding temperatures. Apparently, the cyanuric acid-formaldehyde derivative breaks down at molding temperatures to release the molding catalyst. Possibly, the small amount of formaldehyde thus released aids in forming high-quality moldings that are achieved with the use of the invention.

The following examples illustrate the production of typical urea-formaldehyde molding compounds containing cyanuric acid as latent catalyst and preferred methods of introducing such catalyst into the compositions, but are not intended to be construed as limitative of the invention.

*Example 1*

An alkaline urea-formaldehyde solution was prepared by dissolving 120 grams of urea in 242 grams of formalin (37.5% formaldehyde) and adding 12.0 grams of aqueous ammonia (sp. gr. 0.9). The pH of the resulting solution was 9.4. The aqueous reaction mixture was heated 25 minutes at 44° C. then cooled to 25° C. and neutralized by addition of 11 grams of finely powdered cyanuric acid and then to a pH of 6.9 by addition of 10 grams more of said acid. The resulting liquid was kneaded with 108 grams of alpha-cellulose filler and 4 grams of zinc stearate. The damp crumb produced was rolled on rolls heated to about 120° C. until a dried material possessing a hard, polished surface resulted. This material was ground to a coarse powder in a Wiley mill. Moldings from this product, molded at 147° C. for 1–3 minutes, had excellent appearance, a water absorption of 0.28%, and cross-breaking strength of 13,000 p.s.i.

*Example 2*

The following urea-formaldehyde molding powder example demonstrates use of U.F. Concentrate-85, a commercial product prepared in accordance with U.S. Patent 2,652,377. A solution was prepared by dissolving 78 grams or urea in 149 grams of U.F. Concentrate-85 (containing the equivalent of 60% formaldehyde, 25% urea, and 15% water). The pH of the solution was adjusted to 9.5 with 5.5 grams of aqueous ammonia (sp. gr. 0.9). The aqueous reaction mixture was heated 25 minutes at 40° C. then cooled to 25° C. and the pH adjusted to neutrality by adding 3.1 grams of finely pulverized cyanuric acid and then to pH 6.9 by adding 4.9 grams more of said acid. The mixture was then kneaded with 105 grams of alpha-cellulose filler and 4 grams of zinc stearate. The damp crumb was dried on heated rolls (roll temperature 120°–130° C.) until it acquired a hard, polished surface. This material was ground to a coarse powder in a Wiley mill to give finished molding powder. Moldings from this product, molded at 147° C. for three minutes, had excellent appearance, water absorption of 0.26%, and cross-breaking strength of 13,800 p.s.i.

The foregoing examples clearly demonstrate that moldings prepared from molding powders of the present invention have water absorption, cross-breaking and tensile strength properties that are at least equal to values for first-line commercial alpha-cellulose filled urea-formaldehyde molding powders that have generally published percentages for water absorption of 0.4–0.8 and for tensile strength of 6000–13,000 p.s.i.

While I have disclosed certain preferred urea-formaldehyde compositions and procedures for preparing them in accordance with my invention, I do not thereby desire or intend to limit myself solely thereto. Obviously, the precise proportions of materials utilized may be varied, equivalents of said materials may be substituted, and various additives may be omitted or included as desired, without departing from the spirit and scope of the invention as defined in the appended claims.

I claim:

1. A molding compound that is a solid particulate composition comprising (1) a urea-formaldehyde condensate, (2) from 20% to 35% by weight of said compound of a cellulosic filler, (3) a mold lubricant, and (4) from 0.5% to 5% by weight of said compound of cyanuric acid as a latent curing catalyst.

2. The molding compound of claim 1 wherein the urea-formaldehyde condensate is derived from 1.5 to 1.6 mols of formaldehyde per mol of urea.

3. The molding compound of claim 2 wherein the mold lubricant is present in an amount of from 0.5% to 1% by weight of said molding compound.

4. A method of preparing a urea-formaldehyde molding compound that comprises (A) preparing a urea-formaldehyde resinous composition as an alkaline liquid by heat reacting at a temperature of about 40° to 44° C., 1.5 to 1.6 mols of formaldehyde per mol of urea in the presence of sufficient ammonia to result in a pH for said liquid of from 9 to 10, (B) cooling said alkaline liquid to about 25° C., (C) dissolving an amount of cyanuric acid in said alkaline liquid which is in excess of that necessary to render said alkaline liquid neutral by an amount equal to 1 to 3% by weight of the urea-formaldehyde content of said resinous composition, (D) admixing sufficient solid particulate cellulosic filler into said liquid to form a damp crumb, and (E) reducing the damp crumb to a dry powder.

5. A method of preparing a urea-formaldehyde molding compound that comprises: (A) preparing with heating and under alkaline conditions a urea-formaldehyde condensate composition as a liquid, (B) cooling said liquid to about 25° C., (C) neutralizing said liquid by addition of cyanuric acid, (D) dissolving an additional amount of cyanuric acid in said neutralized liquid to function as latent catalyst, said additional amount being 1 to 3% by weight of the total urea plus formaldehyde, (E) admixing a solid particulate cellulosic filler into said liquid, and (F) reducing the liquid-filler mixture to a dry powder.

6. The method of claim 5 wherein the urea-formaldehyde condensate is prepared by reacting 1.5 to 1.6 mols of formaldehyde per mol of urea.

References Cited by the Examiner
UNITED STATES PATENTS

| | | | |
|---|---|---|---|
| 2,193,621 | 3/1940 | Cordier | 260—69 |
| 2,203,800 | 6/1940 | Simons | 260—17.3 |
| 2,573,525 | 10/1951 | West | 260—850 |
| 2,872,425 | 2/1959 | Paz | 260—17.3 |

FOREIGN PATENTS

| | | |
|---|---|---|
| 420,525 | 11/1934 | Great Britain. |
| 435,871 | 10/1935 | Great Britain. |

OTHER REFERENCES

Ellis: "Chemistry of Synthetic Resins," vol. 1, published by Reinhold Publishers, New York, page 615.

JOSEPH L. SCHOFER, *Primary Examiner*.

LEON J. BERCOVITZ, *Examiner*.